US005771167A

United States Patent [19]
Gomi et al.

[11] Patent Number: 5,771,167
[45] Date of Patent: Jun. 23, 1998

[54] SYNCHRONOUS CONTROL METHOD AND APPARATUS THEREFOR

[75] Inventors: Toshiaki Gomi; Masatomo Yazaki, both of Kawasaki, Japan

[73] Assignee: Fujitsu Limited, Kanagawa, Japan

[21] Appl. No.: 405,894

[22] Filed: Mar. 17, 1995

[30] Foreign Application Priority Data

Mar. 18, 1994 [JP] Japan ................................. 6-048469
Feb. 15, 1995 [JP] Japan ................................. 7-026978

[51] Int. Cl.$^6$ ................................................ G05B 11/01
[52] U.S. Cl. .................. 364/140; 364/270.5; 364/270.9; 364/271.1; 364/271.2; 364/271.3; 364/271.4; 364/410; 395/509; 395/510; 395/949; 395/950; 395/134; 395/340; 345/113; 345/116; 345/119; 345/122; 345/123; 345/125.133; 345/133; 463/4; 463/26; 463/31
[58] Field of Search .................................. 364/140, 410, 364/270.5, 270.9, 271.1, 271.2, 271.3, 271.4; 345/122, 113, 116, 125.133, 123, 133, 119; 395/509, 510, 949, 950, 134, 340; 463/31, 4, 26; 396/165; 370/507; 348/578

[56] References Cited

U.S. PATENT DOCUMENTS

| | | | |
|---|---|---|---|
| 4,112,442 | 9/1978 | Mayer et al. | 395/165 |
| 4,652,998 | 3/1987 | Koza et al. | 463/26 |
| 4,739,406 | 4/1988 | Morton et al. | 348/578 |
| 4,905,168 | 2/1990 | McCarthy et al. | 395/134 |
| 4,930,074 | 5/1990 | McCarthy | 463/31 |
| 5,174,759 | 12/1992 | Preston et al. | 434/317 |
| 5,239,463 | 8/1993 | Blair et al. | 364/410 |
| 5,262,765 | 11/1993 | Tsumura et al. | 345/122 |
| 5,313,462 | 5/1994 | Fujino et al. | 370/103 |
| 5,367,614 | 11/1994 | Bisey | 395/119 |
| 5,414,697 | 5/1995 | Osaki | 370/236 |
| 5,462,275 | 10/1995 | Lowe et al. | 463/4 |
| 5,524,197 | 6/1996 | Uya et al. | 395/340 |
| 5,577,981 | 11/1996 | Javik | 482/4 |

*Primary Examiner*—Reba I. Elmore
*Assistant Examiner*—McDieunel Marc

[57] ABSTRACT

A synchronous control apparatus comprising a trigger signal generating unit periodically generating a trigger signal, plural modules executing plural processes which are to be synchronized with each other, respectively, and a module control unit 31 sequentially starting the plural modules once according to a predetermined execution order, where the module control unit 31 sequentially starts the plural modules once according to the execution order each time the trigger signal is input, so that precise synchronization of the modules is achieved. As a result, synchronously controlling plural modules which can be executed independently from each other, specifically in generating animated images in real time, movements of characters and objects displayed on a screen can be precisely synchronized with each other.

13 Claims, 12 Drawing Sheets

FIG. 5

33 MODULE LIST

| MODULE No. | MODULE NAME | POINTER | ARGUMENT PARAMETER |
|---|---|---|---|
| 0 | MA | FA | DA |
| 1 | MB | FB | DB |
| 2 | MP | FP | DP |
| 3 | NULL | NULL | NULL |

FIG. 8

EVENT SIGNAL MANAGING TABLE

| EMTRY | event_id | lock | intr_count |
|---|---|---|---|
| EVENT index0 | AAA | 1 | 1 |
| EVENT index1 | BBB | 1 | 2 |

SYNCHRONOUS CONTROL METHOD AND APPARATUS THEREFOR

BACKGROUND OF THE INVENTION

1. Field of the Invention

The present invention relates to a synchronous control method and apparatus therefor for plural modules which can be operated independently from each other for synchronizing movements of characters controlled by the plural modules, for example, to generate animated image at real time by CG (computer graphics).

2. Description of the Related Art

Because of recent sophistication in computer systems, it has become possible to generate an animation at real time. It has also become possible to interactively operate a character or object in an animation by man. In addition, in generating CG images in an animation at real time, plural characters or objects are often simultaneously displayed on a screen, or sound effects are generated simultaneously. In such system, it is required to accurately compose images displayed on a screen frame by frame.

First of all, a method for controlling a multi-processing system by conventional TSS (Timing Sharing System) to display two objects on a screen, and move them from an upper side to lower side of the screen simultaneously at an identical speed is described.

FIG. 1 is a block diagram showing a circuit for controlling two objects jiggle target A JTA and jiggle target B JTB displayed on a screen HG of prior art, and FIG. 2 a schematic view showing a state of two objects JTA and JTB controlled by the circuit shown in FIG. 1.

Generally, in a multiprocess system, two objects JTA and JTB are displayed on a screen hardware graphic HG, and an A process PA and a B process PB of an identical function are allocated to the objects JTA and JTB, respectively, for controlling their respective position and movement.

In FIG. 1, the A process PA is to store an image of the object JTA in an video memory VM, and move it downward by specified dots, for example, 5 dots, and the movement amount of the object JTA depends on a total timing during which the A process PA is executed, because the processing steps are repeated during execution of the A process PA. The B process PB and the object JTB are also in the same relation with each other.

The execution of processes PA and PB is controlled by a scheduler SC, and the processes PA and PB are sequentially started and executed in an order of priority according to signals outputted by a timer TM at a predetermined interval.

However, in the case of such prior art, the execution of processes PA and PB has no relation with a display timing on the screen HG controlled by means of a video synchronous signal. Therefore, it is a problem that a total execution timing of the process PA may be different from that of the process PB at each display timing. As a result, the objects JTA and JTB cannot be moved at an identical speed on the screen HG, and do not synchronize with each other, as shown in FIG. 2.

It is assumed, for example, that the objects JTA and JTB are displayed in a same vertical position on the screen HG at a display timing th1. Now, a period from the display timing th1 to a display timing th3 is considered. Firstly, during a period from the display timing th1 to a display timing th2, the A process PA is executed once, then the B process PB once, and the display timing th2 comes before the A process PA is completely executed again. During a period from the display timing th2 to the display timing th3, before the A process PA is completely executed, the B process PB is started at the display timing th2, and the A process PA is succeedingly started and executed.

When the display timing th3 comes when the A process PA is completely executed, it means that the processes PA, PB are completely executed twice, respectively, and the A process PA is incompletely executed during the period between the display timings th1 and th3. Accordingly, as shown in FIG. 2, at the display timing th3, a movement amount of the object JTA exceeds that of the object JTB. Thus, since the objects JTA and JTB should be moved simultaneously at an identical speed, images displayed on the screen HG at the display timing th3 are erroneous.

Additionally, in the case where a system call occurs at a time ta during execution of the A process PA, the execution of A process PA is discontinued at the time ta, and the B process PB is executed after a short processing for the system call. Thus, even when the processes PA and PB are executed same times during a period from a certain display timing thi to the succeeding display timing thi+1, an execution time of the A process PA is less than that of the B process PB, and the total execution time is different between them. In such case, movement amounts of the objects JTA and JTB comes to be different.

Moreover, when the scheduler SC is interrupted for booting up a process except the processes PA, PB and another C process PC is responsively executed, the execution time of processes PA and PB during a period including the process PC is reduced, and the objects JTA and JTB are moved at a reduced speed.

It means that, in a multiprocess system using a conventional TSS, execution timings of processes are generally controlled inaccurately, and the processes are operated without any relation with time schedules of other processes. Therefore, consumption of time for execution of a certain process affects other processes, and the overall processing speed is reduced as well.

As described above, in prior art, the movement speed of the objects JTA and JTB on the screen HG cannot be precisely synchronized, and it has been impossible, therefore, to compose images displayed on the screen in synchronization with each other by frames. Although such problem may be solved, for example, by an interprocess communication or use of lock function for synchronization between processes, a very complicated control is required for such operation.

Furthermore, in the case that plural characters or objects are displayed simultaneously on the screen HG, it is also required to consider when two or more objects are integratedly put into action. It means, for example, when a bird eats a fruit swung by a wind, or when two men walks toward each other, and shake hands. In order to generate images of such situation in an animation at real time, a process for integratedly displaying the two objects is used from when they come to a certain distance from each other until they move apart to a certain distance.

In the first example described above, an image of the fruit swung by a wind and that of the bird are displayed by means of two independent processes, and they are switched to a single process, from when the bill of the bird comes to a certain distance from the fruit, for displaying such image that the bird picks and eat the fruit. Then, after the bird eats up the fruit, it is switched to another process for displaying an image of the bird, and, when the bird starts eating the fruit, but unfortunately the fruit falls off his beaks, an image of the fruit falling and that of the bird following the fruit with his eye are displayed by an independent process from the moment the fruit falls off the beaks of the bird.

In the case of the second example above, although images of two men are displayed initially by independent processes, it is switched to a single process for displaying an image of two men shaking hands with each other from immediately before the handshaking. Then, after the handshaking, images of the two are displayed individually by the independent processes again.

For generating such animated images at real time, such operation is required for processing that two processes for image display are switched to single process, contrarily, single process switched to two processes or other process is added to a process.

SUMMARY OF THE INVENTION

The preset invention has been devised in the light of such problems as described above, it is an object of the invention to provide a method and apparatus for controlling plural modules operated independently from each other for precisely synchronizing movements of characters or objects displayed on a screen, for example, to generate animated images at real time.

It is another object of the invention to provide a method and apparatus for executing various processes by time sharing system in parallel as well.

It is a further object of the invention to provide a method and apparatus for assuring a coincidence in frames, and accurately synchronizing movements of characters or objects displayed on a screen with each other in generating animated images at real time.

It is the other object of the invention to provide a method and apparatus for assuring execution of each module by registering plural modules to synchronize with each other in a module list.

It is still other object of the invention to provide a method and apparatus for allowing an image generated by an image module to be displayed on a screen as it is by switching with a frame synchronizing signal.

It is a final object of the invention to provide a method for such processing as grouping and regrouping of modules required when images generated individually by two or more modules are integrated and generated as an image in a module, or an image generated by an image module is contrarily divided to two or more images, and generated in individual modules, respectively.

According to a first aspect of synchronous control method of the invention, as shown in FIG. 3 through FIG. 6, a system comprising a trigger signal generating unit 21 for periodically generating a trigger video signal SV, plural modules module A MA, module B MB and module print MP for executing different processes to be synchronized, respectively, and a module control unit 31 for sequentially starting the plural modules MA, MB and MP in an execution order is provided, and the plural modules MA, MB and MP are executed sequentially in a specified order once by module by a module control unit 31 each time a trigger signal is inputted in order to solve the problems.

According to a synchronous control method of the invention, another process PE of time sharing system is executed after the modules MA, MB and MP are completely executed and before a next trigger signal SV is generated.

A synchronous control apparatus according to the invention comprises a trigger signal generating unit 21 for periodically generating a trigger signal SV, plural action generating modules MA and MB for executing respectively different action generating processes to be synchronized with each other for display on a screen HG, an image module MP for storing images based on a result of processing executed by the action generating modules MA and MB in an video memory and a module control unit 31 for sequentially starting the action generating modules MA, MB and image module MP once for each module in a predetermined execution order each time the trigger signal SV is inputted, so that the image module MP is executed lastly.

Additionally, in a synchronous control apparatus according to the invention, the trigger signal generating unit 21 is arranged for generating a trigger signal synchronized with a frame synchronizing signal for switching between images displayed on the screen HG.

Moreover, in a synchronous control apparatus according to the invention, the module control unit 31 comprises a module list 33 having information for specifying the action generating modules MA, MB and image module MP and information regarding an execution order of the modules registered thereto and a module starting unit 32 for starting the modules according to the module list 31.

Furthermore, in a synchronous control apparatus according to the invention is configured such that the image module MP has two video memories VM1 and VM2 into which images are stored alternately, and contents of the video memories VM1 and VM2 are alternately read out and displayed on the screen HG.

Further, a synchronous control apparatus according to the invention is configured such that the other process of time sharing system is executed after the image module MP is completely executed and before a next trigger signal SV is generated.

In addition, a synchronous control apparatus according to the invention comprises a trigger signal generating unit 21 for periodically generating a trigger signal SV, plural action generating modules MA and MB for respectively executing different action generating processing to be synchronized for displaying on a screen HG, an image module MP for storing images based on a processing results executed by the action generating modules MA and MB, an interrupt processing unit 23 for enabling interruption of a normal process PE in time sharing system to execute a process of higher priority level by means of the trigger signal SV, a module control unit 31 for sequentially starting the action generating modules MA, MB and image module MP in a predetermined execution order once by module, so that the image module MP is executed lastly, and a TSS control unit 22 for starting a process PE after execution of the image module MP is completed.

Further, a synchronous control method according to the invention is that plural modules for executing different processes are classified into plural groups, each group are synchronously controlled by means of lower schedulers by registering the modules included in the groups to a module list, and each lower scheduler is controlled by means of a higher scheduler, wherein a port management table is set for controlling an input signal including information for specifying a wait state module from each module to each lower scheduler, a module management table is set for each module and includes first information for specifying the lower schedulers to which each module belongs, a second information for specifying a port at which each module waits, and a third information, when a predetermined signal is transmitted by any one of modules to the port indicated by its second information, for specifying the lower scheduler to which the module belongs.

According to a first aspect of a synchronous control method and apparatus of the invention, by means of the trigger signal SV outputted from the trigger signal generating unit 21, for example, an interrupt is given to the CPU, and control is switched to a module control unit 31 by interrupt processing.

The module control unit 31 sequentially boots up plural modules MA, MB and MP in a predetermined execution order once by module to execute them once by module, respectively. After the modules MA, MB and MP are completely executed and before the trigger signal SV is succeedingly inputted, another process PE of time sharing system can be executed.

In the case where the trigger signal SV is synchronous with a frame synchronizing signal, by such operation, the modules MA, MB and MP are substantially executed simultaneously in a frame, and objects or characters moving in accurate synchronization with each other are displayed on the screen HG.

Because the module starting unit 32 and module list 33 are provided in the module control unit 31, the modules registered in the module list 33 are surely started and executed by the module starting unit 32.

With two video memories VM1 and VM2, contents stored alternately therein are alternately read out frame by frame, transmitted to a display unit, and displayed on the screen HG.

According to a second aspect of the invention, when a first module registered in the module list of first lower scheduler outputs, a predetermined signal with specifying any one of ports, the module management table of a second wait state module specified by the information set in the port management table of the specified port is read out, information specifying the first module is set as third information of the read out module management table, and control of the second module is switched to the first lower scheduler by deleting the second module from the module list of lower scheduler to which the second module belongs, and registering it to the module list of the first lower scheduler.

The above and further objects and features of the invention will more fully be apparent from the following detailed description with accompanying drawings.

BRIEF DESCRIPTION OF THE DRAWINGS

FIG. 5 is a schematic diagram showing an example of module list;

FIG. 8 is a schematic diagram showing an event management table provided in an event signal processing unit of FIG. 7;

DESCRIPTION OF THE PREFERRED EMBODIMENTS

Figure 1:
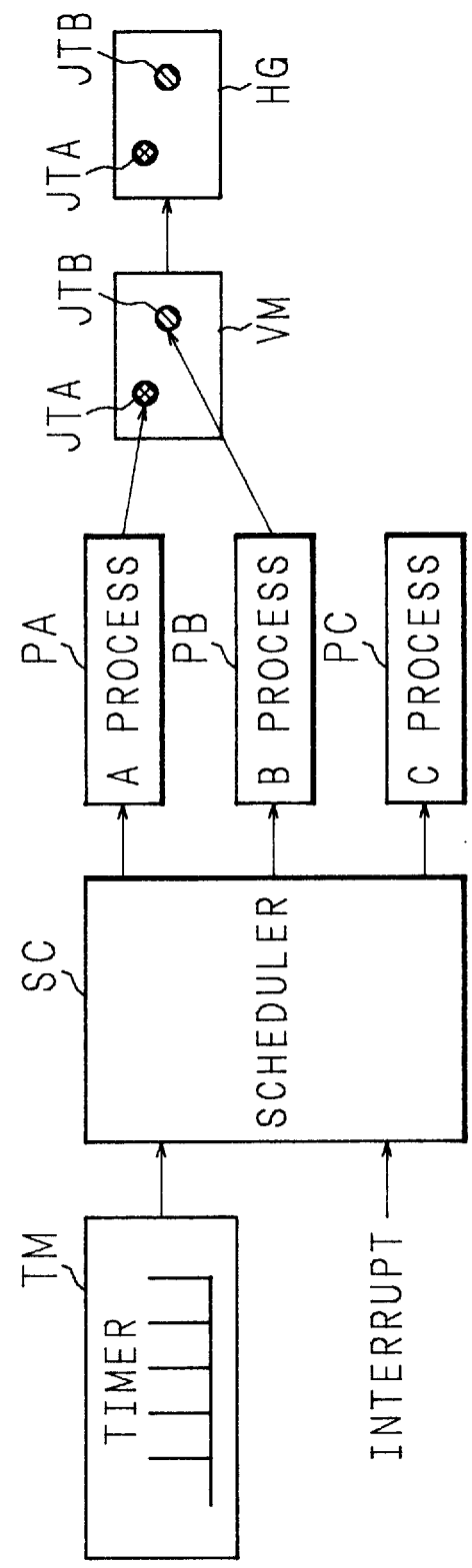
FIG. 1 is a block diagram showing a circuit of prior art for controlling two objects displayed on a screen.
Figure 2:
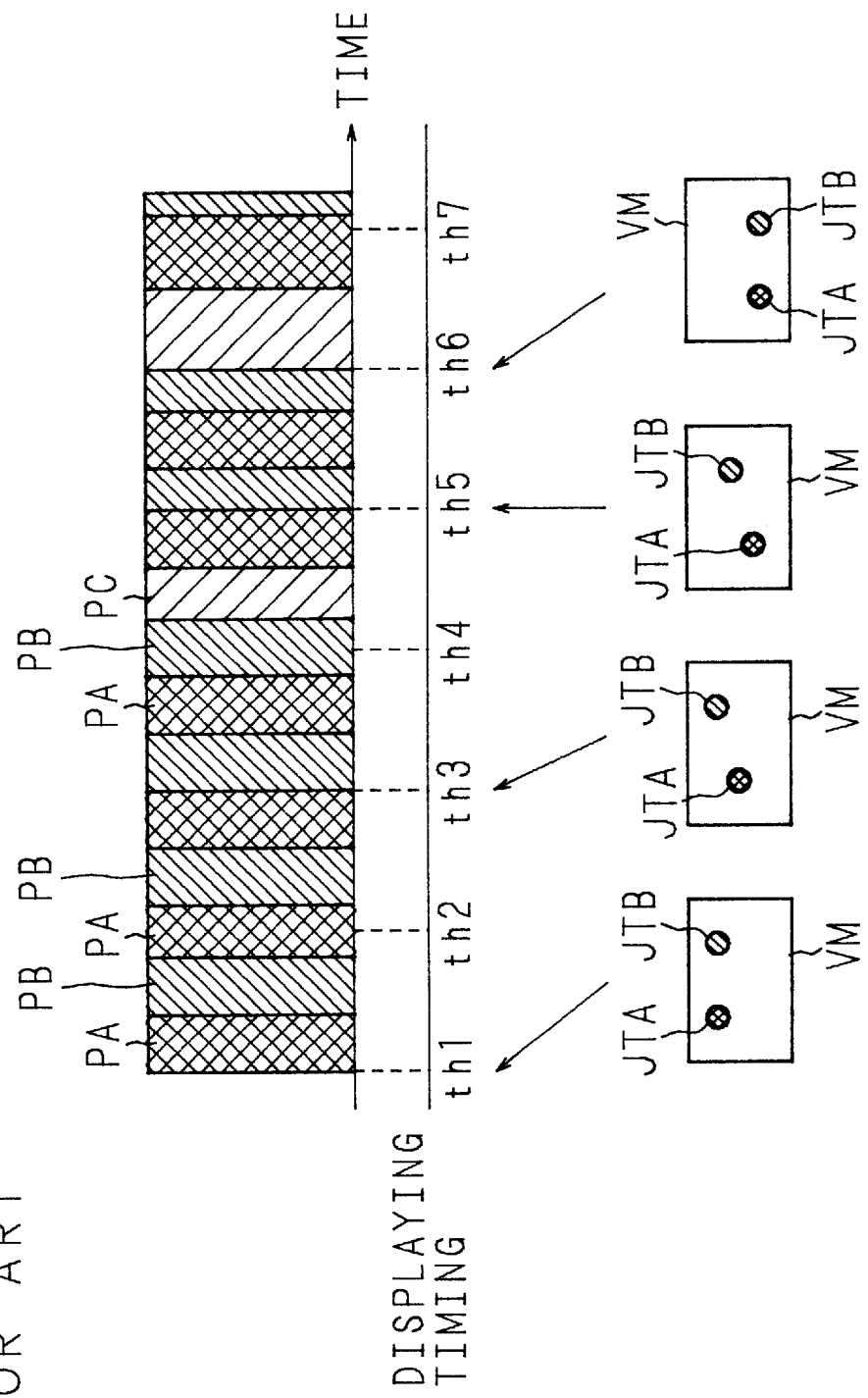
FIG. 2 is a schematic diagram showing a control state of two objects controlled by the control circuit of FIG. 1.
Figure 3:
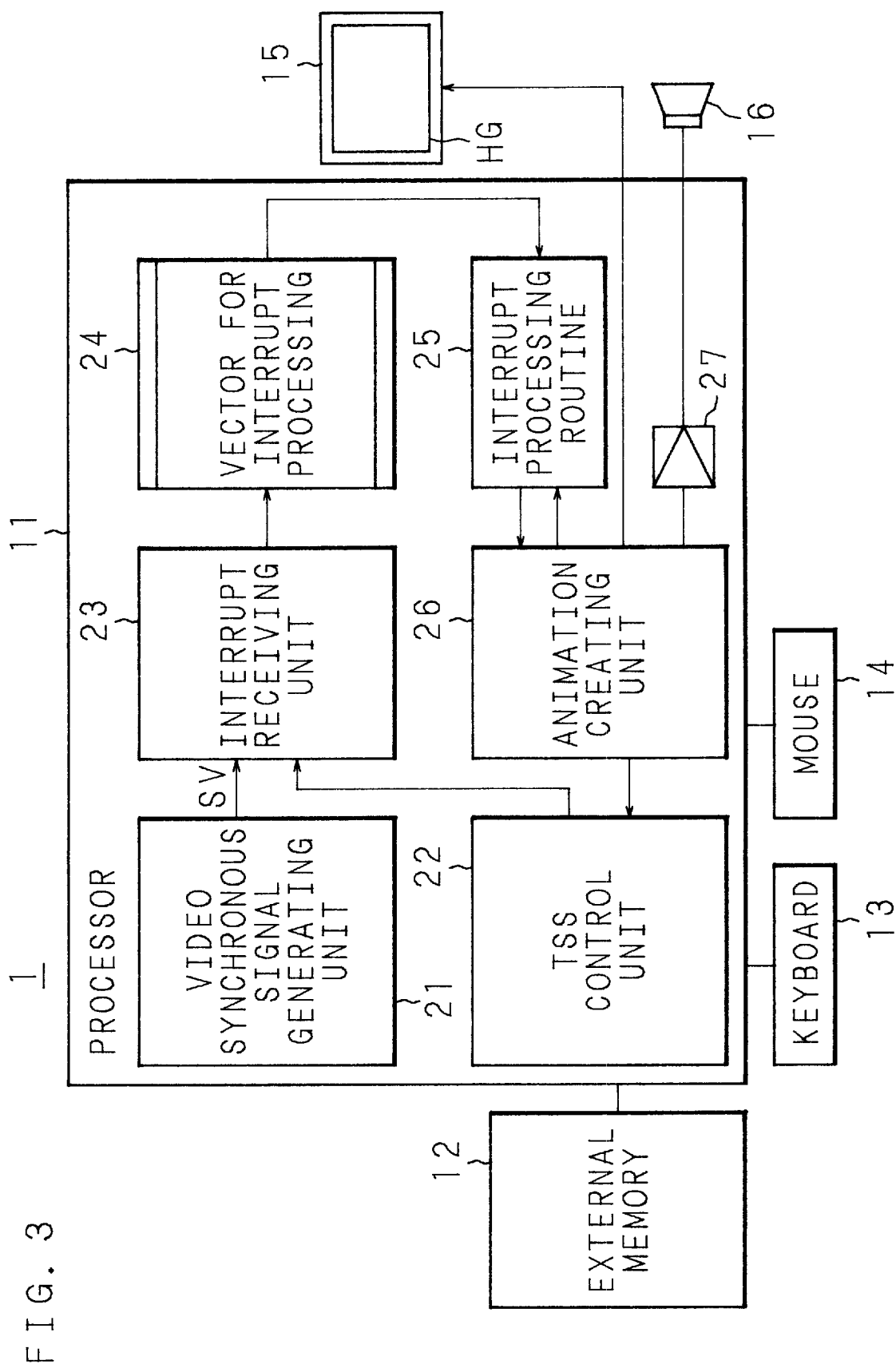
FIG. 3 is a block diagram showing an image processor to which the present invention is applied.

The invention is described in detail below by referring to the drawings showing embodiments. FIG. 3 is a block diagram illustrating a configuration example of image processor to which the present invention is applied.

In FIG. 3, an image processor to which the present invention is applied is shown by reference numeral 1, and is configured by a processor 11, an external memory 12, a keyboard 13, a mouse 14, a display unit 15, a speaker 16, and the like.

The processor 11 comprises such hardware as a CPU, a ROM, a RAM and other peripheral devices, is operated on the basis of TSS (time sharing system), functions for generating various animations, and displaying them on a screen HG of the display unit 15, and generates audio signals to output sounds, and the like. The processor 11 is provided with a video synchronous signal generating unit 21, a TSS control unit 22, an interrupt receiving unit 23, an interrupt vector table 24, an interrupt processing routine 25, an animation generating unit 26, an amplifier 27, and the like.

For the external memory 12, such read/write memory as a magnetic disk device or such read-only memory as a CD-ROM device can be employed. The keyboard 13 and the mouse 14 are used for inputting a command or data to the processor 11.

In the processor 11, the video synchronous signal generating unit 21 is a circuit for generating a video synchronous signal (frame synchronizing signal) SV for switching displaying on the screen HG of the display unit 15 frame by frame, and the CPU is subjected to hardware interruption each time the video synchronous signal is inputted. The video synchronous signal SV is generated, for example, at an interval of 1/60 sec.

The TSS control unit 22 controls TSS in the processor 11, and interrupts the CPU at a predetermined interval for starting a process. An interrupt from the video synchronous signal generating unit 21 has a higher priority level than the TSS control unit 22, and interrupt processing from the TSS control unit 22 is, therefore, executed after completion of interrupt processing from the video synchronous signal generating unit 21, when it is allowed.

The CPU executes interrupt processing by an interrupt signal as a trigger, when it is interrupted by the interrupt receiving unit 23. The interrupt receiving unit 23 refers to an interrupt vector corresponding to an interrupt signal in the interrupt vector table 24, and executes a processing routine located at the interrupt vector. Upon interruption from the video synchronous signal generating unit 21, the CPU calls the interrupt processing routine 25, and calls the module control unit 31, which will be described later, in the animation generating unit 26 by executing the interrupt processing routine 25.

Figure 4:
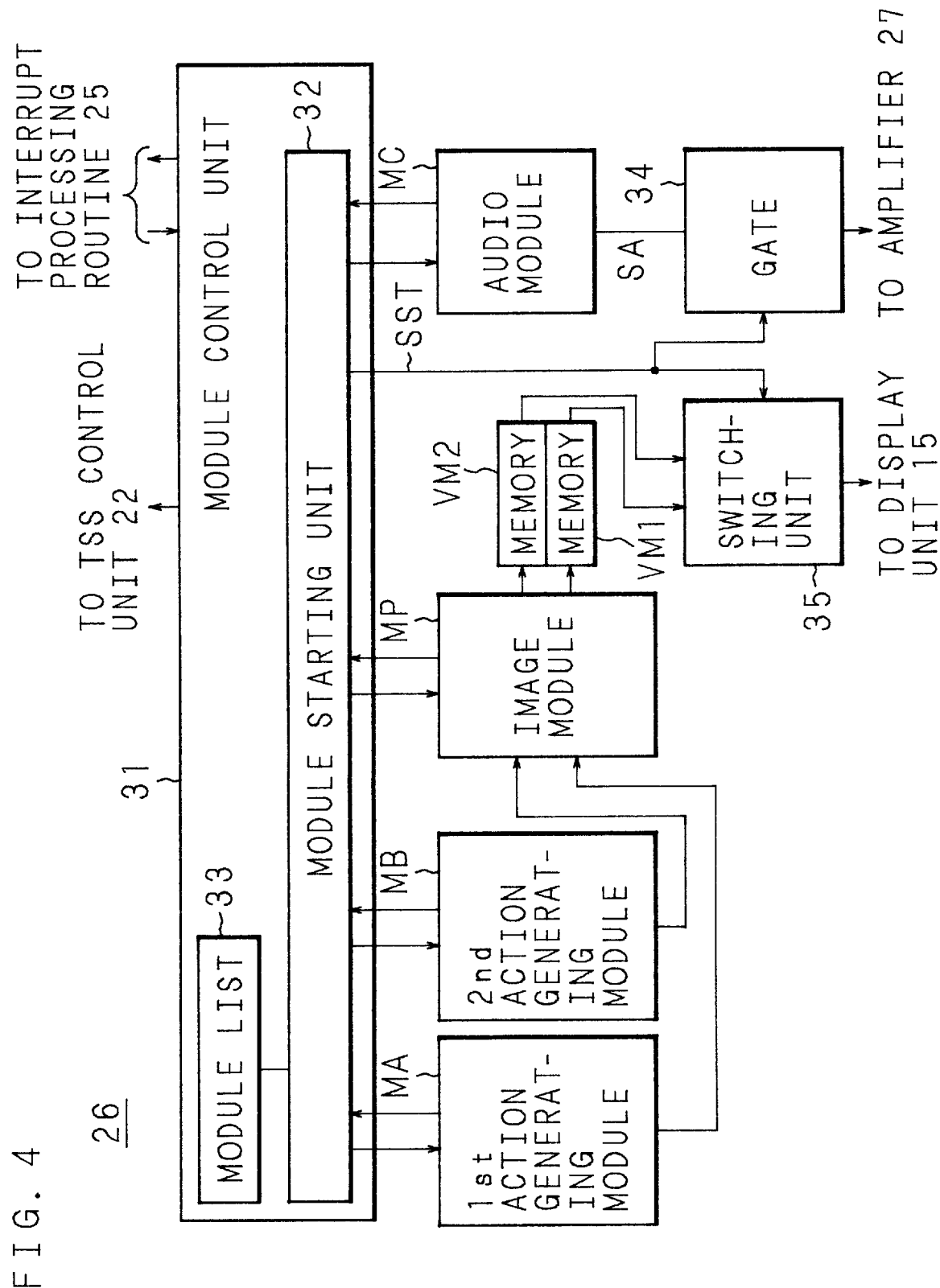
FIG. 4 is a block diagram showing an animation generating unit.

FIG. 4 is a block diagram showing a configuration example of the animation generating unit 26 of the image processor 1 shown in FIG. 3. In FIG. 4, the animation generating unit 26 comprises a module control unit 31 including a module starting unit 32 and a module list 33, a first action generating module MA, a second action generating module MB, an image module MP, an audio module MC, a gate 34, a switching unit 35, and the like.

The first and second action generating modules MA and MB are for executing plural action generating processings to be synchronized with each other for displaying on the screen HG. Practically, it effects for moving an object JTA or JTB downward by specified dots (5 dots, for example) on the screen HG.

The image module MP composes or generates images according to a processing results by the action generating modules MA and MB, and stores them alternately into two video memories VM1 and VM2. The audio module MC is for generating sounds synchronized with a display effected by the action generating modules MA and MB. The switching unit 35 serves for reading images stored in the video memories VM1 and VM2 by alternately switching them from frame to frame by means of a switching signal SST from the module starting unit 32, and outputting them to the display unit 15. The gate 34 functions to switching on/off of output of an audio signal SA from the audio module MC, and is controlled by means of the switching signal SST from the module starting unit 32.

The module control unit 31 is called in a form of a function call by the interrupt processing routine 25. The module starting unit 32 refers to the module list 33 each time the module control unit 31 is called, and starts and executes modules registered in the module list 33 once by module in a predetermined order.

FIG. 5 is a schematic diagram showing an example of the module list 33 included in the animation generating unit 26. In FIG. 5, module number, module name, pointer to a module function and argument parameters are registered for each module in the module list 33. The module list 33 holds a data in an array of structures, the module numbers corresponds to each array element number, and the module name, pointer and argument numbers correspond to members of the structures. When a pointer is "NULL", it indicates each end of the element. The module control unit 31 calls each module function to the end of the elements by means of the following expression:

$$ret=(*FA)(DA);/*\text{when }MA*/$$

where "ret" is an execution result code, and argument parameter such as "DA" is for providing a module with event information, but the parameter itself may not always be event information, and can be used in different manners such as a pointer to an event structure having plural event parameters depending on interpretation in the modules.

The module starting unit 32 issues events registered in the module list 33 to the modules MA, MB, MC and MP, and each module receives them, and processes necessary processing.

In the module list 33 of FIG. 5, events for the action generating modules MA, MB and image module MP are registered, and the module starting unit 32 starts and executes the action generating modules MA, MB and image module MP once by module in such order by referring to the module list 33.

After the module control unit 31 has issued all events registered in the module list 33 to the modules, that is, when processing of the module control unit 31 is completed, control is returned back to the interrupt processing routine 25, and the modules come to be in a state of waiting for processing until next time the module control unit 31 is called from the interrupt processing routine 25.

After the control is returned back to the interrupt processing routine 25, it is further switched to the TSS control unit 22. Thus, the CPU is controlled by the TSS control unit 22 until the video synchronous signal SV is inputted for the next time, and executes TSS processing independently from such displaying timing on the screen HG (interval of the video synchronous signal SV) as activation and execution of the other process PE. When a succeeding video synchronous signal SV is outputted, the CPU interrupts the TSS processing even when it is under way. The interrupted TSS processing should be executed in a succeeding frame from the point it has been interrupted.

Although no event of the audio module MC is registered in the module list 33 shown in the schematic diagram of FIG. 5, when such event is registered, the audio module MC is started according to a registration order. The audio module MC counts up each time a specified time has elapsed in a frame, amplifies a data obtained by means of the amplifier 27, and outputs it as a sound effect from the speaker 16.

Figure 6:
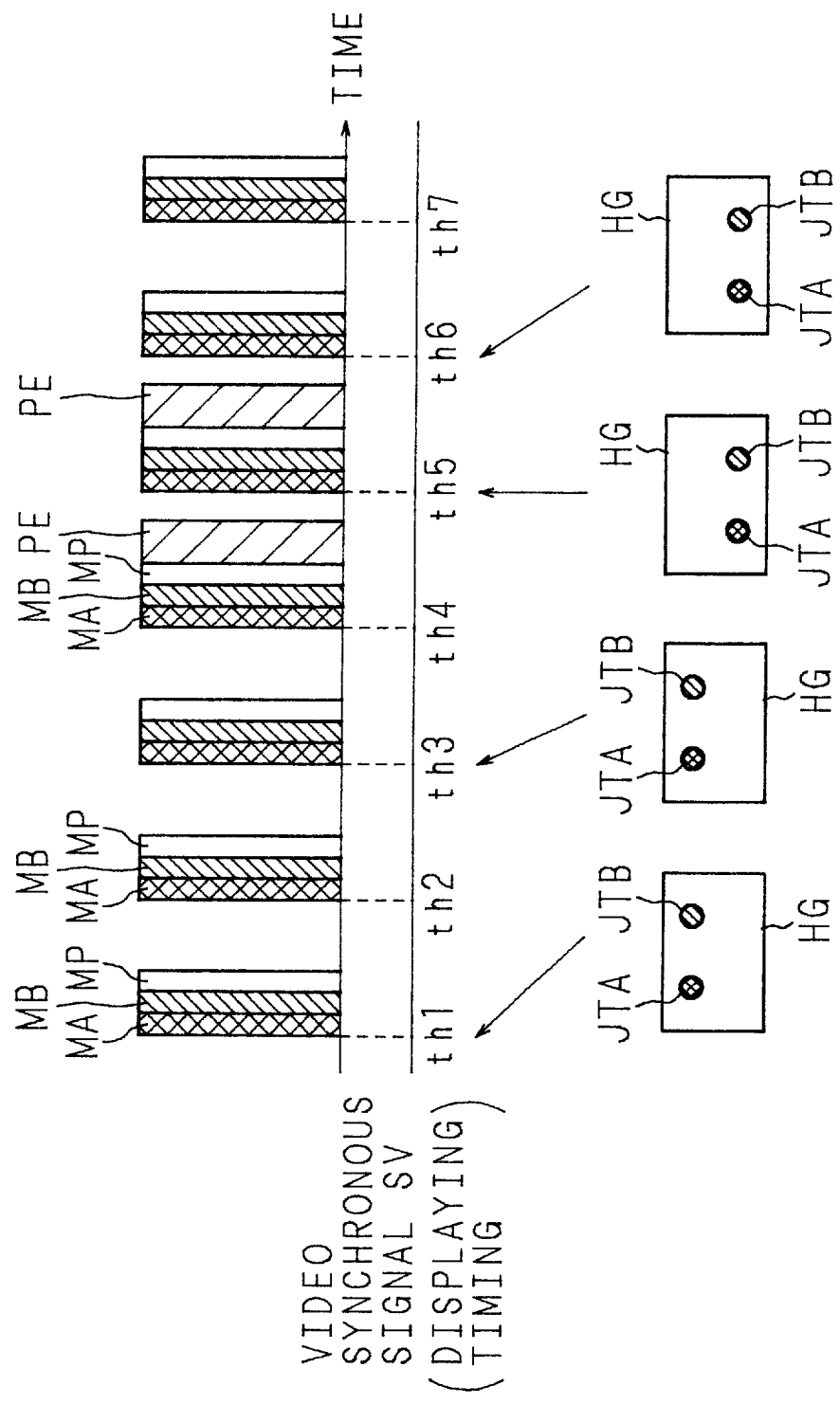
FIG. 6 is a schematic diagram showing a control state of two objects controlled by the animation generating unit.

Now, an operation according to the invention is described by referring to FIG. 6 which is a schematic diagram showing two objects JTA and JTB controlled by the animation generating unit 26. In FIG. 6, each time the video synchronous signal SV is outputted from the video synchronous signal generating unit 21, both the action generating modules MA and MB and image module MP are accurately executed once by module in such order. Therefore, the objects JTA and JTB on the screen HG are moved downward accurately by 5 dots per a frame. In other words, the objects JTA and JTB are simultaneously displayed on the screen HG, and moved in accurate synchronization with each other at an identical speed.

Also, in a duration of a frame, after the module are controlled by the module starting unit 32, control is performed by the TSS control unit 22, and various processes PE are executed as required.

In such manner, with the animation generating unit 26, a duration of one frame, that is, a period between two successive video synchronous signals SV can be handled as an identical clock time in relation to locations of two objects JTA and JTB displayed on the screen HG. Therefore, by providing an action generating module for other objects or characters which are desired to be displayed synchronously on the screen HG, and registering them to the module list 33, they are executed in one frame, and displayed in accurate synchronization with each other on the screen HG.

In order to execute and synchronize the audio module MC and other modules in addition to the action generating module, such events can be registered to the module list 33.

Moreover, by providing modules for executing plural processes that should be synchronized with each other in addition to those for display of objects or generation of sound effects, and registering them to the module list 33 as required, such processes can be executed frame by frame in parallel.

As described above, according to this embodiment, plural modules can be synchronously controlled, and coincidence in time by frame can be assured. Specifically, in the case of generating animated images at real time, movements of characters or objects displayed on a screen can be accurately synchronized with each other. By employing such system for an operating system, it is applicable to control of real-time processing of an operating system for handling multimedia and the like.

In the embodiment above, the interrupt vector table 24, interrupt processing routine 25, module control unit 31, action generating modules MA and MB, image module MP and other elements are realized by software, and are located in a memory operated by the CPU in the processor 11.

In the embodiment above, the video synchronous signal SV may be at an interval of, for example, 2/60, 3/60, 4/60 sec. or the like, instead of 1/60 sec. Also, in the video synchronous signal generating unit 21, a video synchronous signal SV synchronous with a video signal of the display unit 15, that is, a video synchronous signal SV synchronous with a frame synchronizing signal for switching images displayed on the screen HG or a video synchronous signal SV non-synchronous with such signal may be generated.

Although the CPU is interrupted by the video synchronous signal generating unit 21 for generating the video synchronous signals SV in the embodiment above, a trigger signal generating unit may be provided for generating trigger signals at a specified interval that may not be synchronous with a frame interval, so that the CPU is interrupted thereby. In such case, although processing results of the modules may not be accurately synchronous in each frame, since the modules are executed identical times in a long term, processes executed by the modules can be synchronized with each other.

In the embodiment, the interrupt processing routine 25 may not call the animation generating unit 26 each time the routine is executed, and may call the animation generating unit 26, for example, once every two, three, four or more times the routine is executed. In this manner, when the video synchronous signal SV is at an interval of 1/60 sec., the frame interval can be at 2/60, 3/60, 4/60 sec. or the like.

In the embodiment above, activation of the modules in the animation generating unit 26 may be sequenced by registering identification codes corresponding to priority levels of the modules in the module list 33, and referring to the identification codes. Construction of the entirety or a part of the image processor 1, arrangement of the animation generating unit 26, type and number of the modules, processes, processing sequence, operation timing and the like may be changed in various manners without departing from the spirit of the invention.

Although movements of the objects JTA coincidence JTB on the screen HG are controlled by using two action generating modules MA and MB for synchronization, in other words, for assuring in the embodiment above, such movements of the objects JTA and JTB cannot be controlled when they are integrated, and after they are separated again into two objects JTA and JTB from the integrated state.

A second aspect of synchronous control method and apparatus according to the invention is described below for controlling in such cases, that is, for switching control to exclude one or more modules from a group of two or more modules under control, or include one or more modules additionally to several modules under control to make a group.

Figure 7:
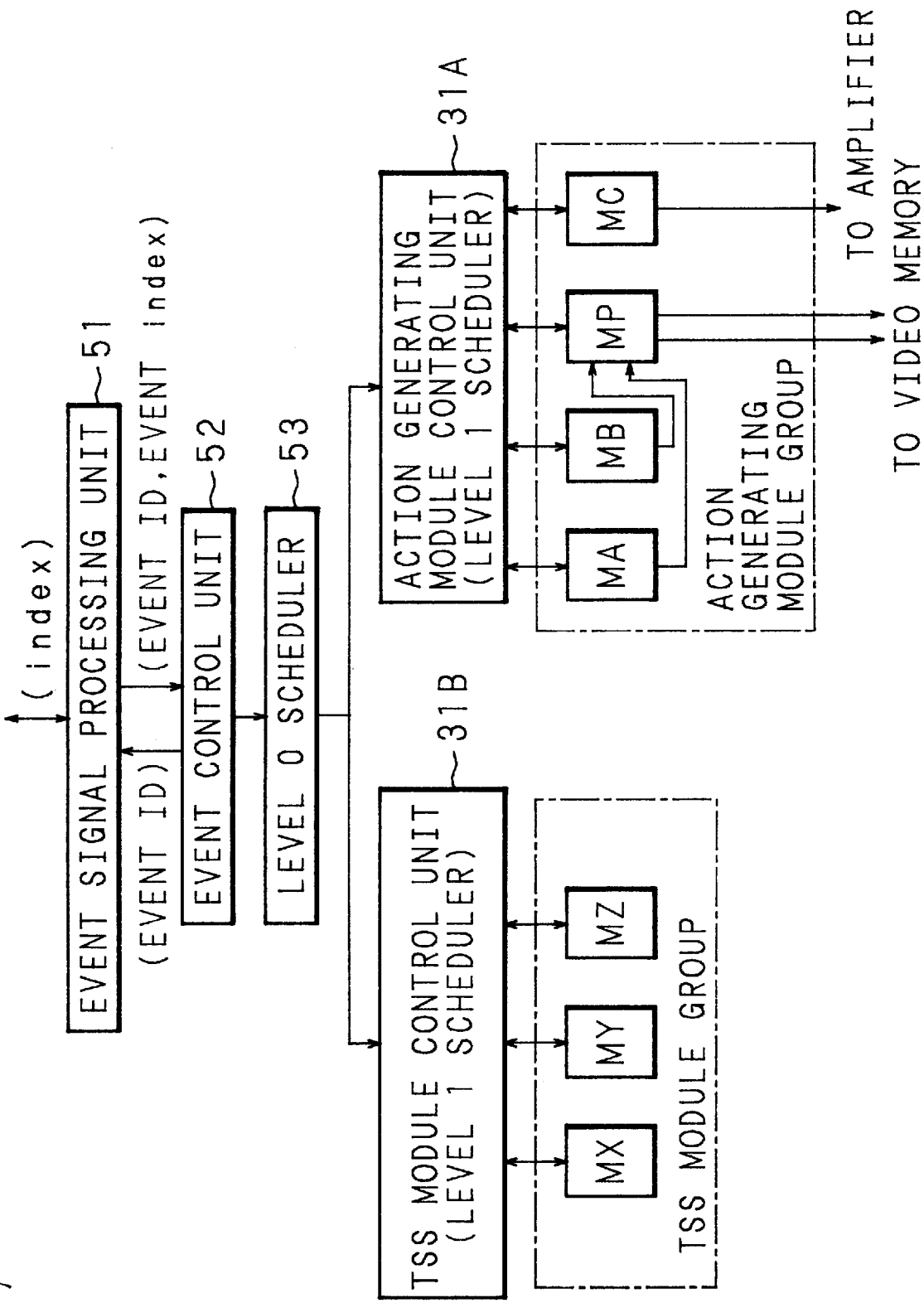
FIG. 7 is a block diagram showing an essential portion of an configuration example for carrying out a second aspect of synchronous control method according to the invention.

FIG. 7 is a block diagram showing essential portion of a configuration example for carrying out the second aspect of synchronous control method according to the invention. An entire synchronous control apparatus according to the second aspect of the invention is not shown, because it is configured similarly to that of the first aspect of the invention shown in FIG. 3, and only configuration of a portion corresponding to the animation generating unit 26 of the first aspect of the invention is shown.

In FIG. 7, reference numeral 31A shows an action generating module control unit basically similar to the module control unit 31 in FIG. 4, and 31B a TSS module control unit for controlling modules controlled by TSS, respectively. Although the module control unit 31 operates directly according to signals outputted from the interrupt processing routine 25 in the animation generating unit 26 of the first aspect of invention shown in FIG. 4, in this aspect, an event signal processing unit 51, an event control unit 52 and a level 0 scheduler 53 that is a higher scheduler are present between the interrupt processing routine 25 and the action generating module control unit 31A, the TSS module control unit 31B. The action generating module control unit 31A and TSS module control unit 31B correspond to a level 1 scheduler that is a lower scheduler.

Modules controlled by the action generating module control unit 31A, which is a level 1 scheduler, are modules for generating actions of objects on a screen HG as the action generating module MA and action generating module MB shown in FIG. 4 of the first aspect of invention, an image module MP and an audio module MC. Those controlled by the TSS module control unit 31B include all modules except those controlled by the animation generating module control unit 31A.

Similarly to the first aspect of the invention already described, when an interrupt signal is accepted by an interrupt receiving unit 23, an interrupt vector corresponding to the interrupt signal is referred to in an interrupt vector table, and a processing routine located at the interrupt vector is executed by the interrupt processing routine 25. The event signal processing unit 51 receives an event signal (index) generated by the routine that is executed by the interrupt processing routine 25, and controls an event signal management table provided therein.

FIG. 8 is a schematic diagram showing the event management table provided in the event signal processing unit 51. From the interrupt processing routine 25, event signals (index 0, index 1 . . . ) responsive to the interrupt signals are given to the event signal processing unit 51. The event signal processing unit 51 inputs and manages each event signal, and outputs an event ID to the event control unit 52.

In detail, the event signal management table is sectioned to event index entries (event index 0, 1 . . . ) corresponding to each event signal, and each entry is correspondingly associated with fields of such parameters as "event id", "lock" and "intr count". The event signal management table is constituted as described below.

In a state shown in FIG. 8, the entry of event index 0 shows that an "AAA" as an "event id" is transmitted ("lock"=1) in response to an event signal of index 0 once received ("intr count"=1). The entry of event index 1 shows that a "BBB" as an "event id" is transmitted ("lock" =1) in response to another event signal of index 1 ("intr count"=2) received when the "BBB" as an "event id" was transmitted in response to receipt of an event signal of index 1.

Figure 9:
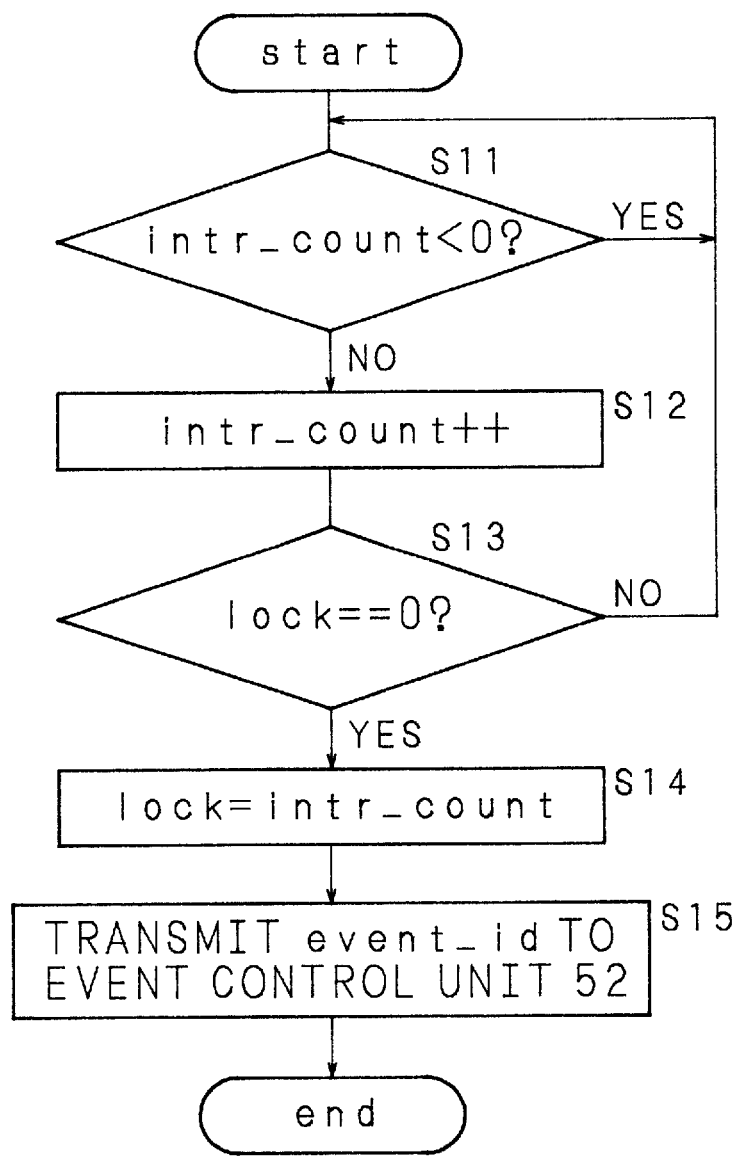
FIG. 9 is a flowchart showing operations of the event signal processing unit at state of event processing.

Practically, the event signal processing unit 51 is operated as shown in a flowchart of FIG. 9. Now, it is assumed that an event signal index 0 is given to the event signal processing unit 51 by the interrupt processing routine 25. The event signal processing unit 51, firstly, checks a value of the parameter "intr count" (step S11), and returns as an error, when it is less than "0", or increments a value of the parameter "intr count", when it is "0" or more (step S12). Then, the event signal processing unit 51 checks a value of the parameter "lock" (step S13), and returns, when it is not "0", or substitute a value of the parameter "lock" for a value of the parameter "intr count", when it is "0" (step S14), then transmits a corresponding "event id", that is, the "AAA" in this case to the event control unit 52 (step S15).

Figure 10:
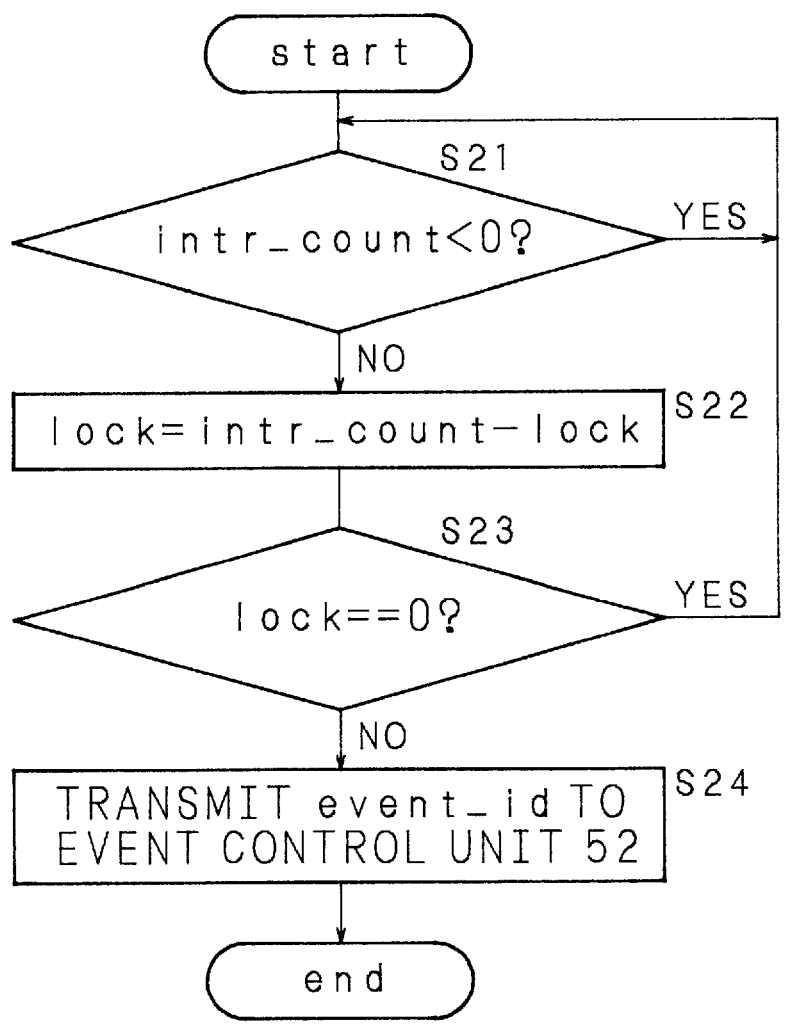
FIG. 10 is a flowchart showing operations of the event signal processing unit at the end of event processing.

Now, when the event processing is completed, the event signal processing unit 51 comes to be an event waiting state as described later, and a process shown in a flowchart of FIG. 10 is executed. That is, the event id of an event completely processed is given to the event signal processing unit 51 from the event control unit 52. In this case, the event signal processing unit 51 firstly checks a value of the parameter "intr count" (step S21), and returns as an error, when it is less than "0", or substitutes a value of the parameter "lock" for a value obtained by subtracting a value of the parameter "lock" from that of "intr count", when the value is "0" or more (step S22). Then, the event signal processing unit 51 checks a value of the parameter "lock" (step S23), and returns to be an event waiting state, when it is "0", or transmits a corresponding "event id" to the event control unit 52, when it is not "0" (step 24). By such processing, even when an event is received again while the same event is under processing, the number of receipts are stored, and a succeeding process is carried out immediately once the process is completed.

Figure 11:
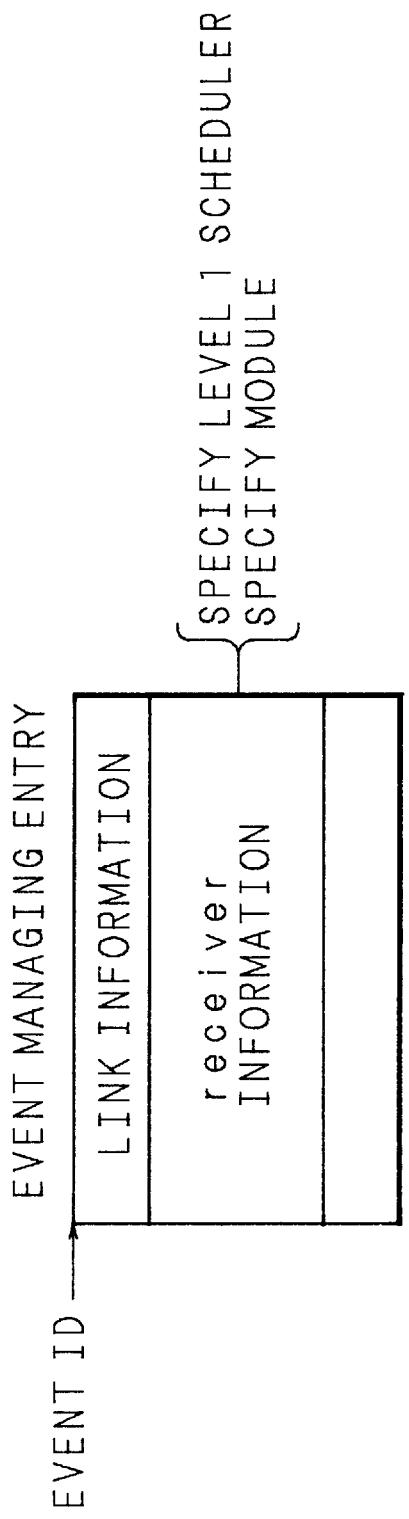
FIG. 11 is a schematic diagram showing contents of plural event control entries, respectively, provided in a event control unit.

The event control unit 52 is provided with plural event control entries, respectively, as shown in a schematic diagram of FIG. 11. Each entry is composed of fields of "link information", "receiver information" and the like. In the field of "receiver information", information for specifying a level 1 scheduler, that is, an animation generating module control unit 31A or TSS module control unit 31B, and information for specifying module are set.

When the event control unit 52 receives an event ID from the event signal processing unit 51 in such manner, it picks up information for specifying a level 1 scheduler from the "receiver information" field of an entry that is indicated by the received event ID, and commands the level 0 scheduler 53 to start the level 1 scheduler, that is, the animation generating module control unit 31A or TSS module control unit 31B. Then, the event control unit 52 links the entry indicated by the event ID (practically, sends the event signal) to an event port of the corresponding level 1 scheduler (31A or 31B) by using link information of the entry.

According to the command from the event control unit 52, the level 0 scheduler 53 starts the level 1 scheduler indicated, that is, the animation generating module control unit 31A or the TSS module control unit 31B.

When the level 1 scheduler, for example, the animation generating module control unit 31A is started by the level 0 scheduler 53, it checks whether any event is linked to its event port (practically, whether any event signal is received). When an event signal is received, the level 1 scheduler reads information that specifies a module from the "receiver information" field of the event control entry linked thereto, and starts the module.

In succession, a process for allowing one module controlled by a level 1 scheduler to be taken over by the other level 1 scheduler. By repeating such operation, plural modules can be taken over for control by the other level 1 scheduler, and all modules controlled by one level 1 scheduler can be taken over by the other level 1 scheduler, while modules controlled by the other level 1 scheduler taken over by said one level 1 scheduler.

Figure 12:
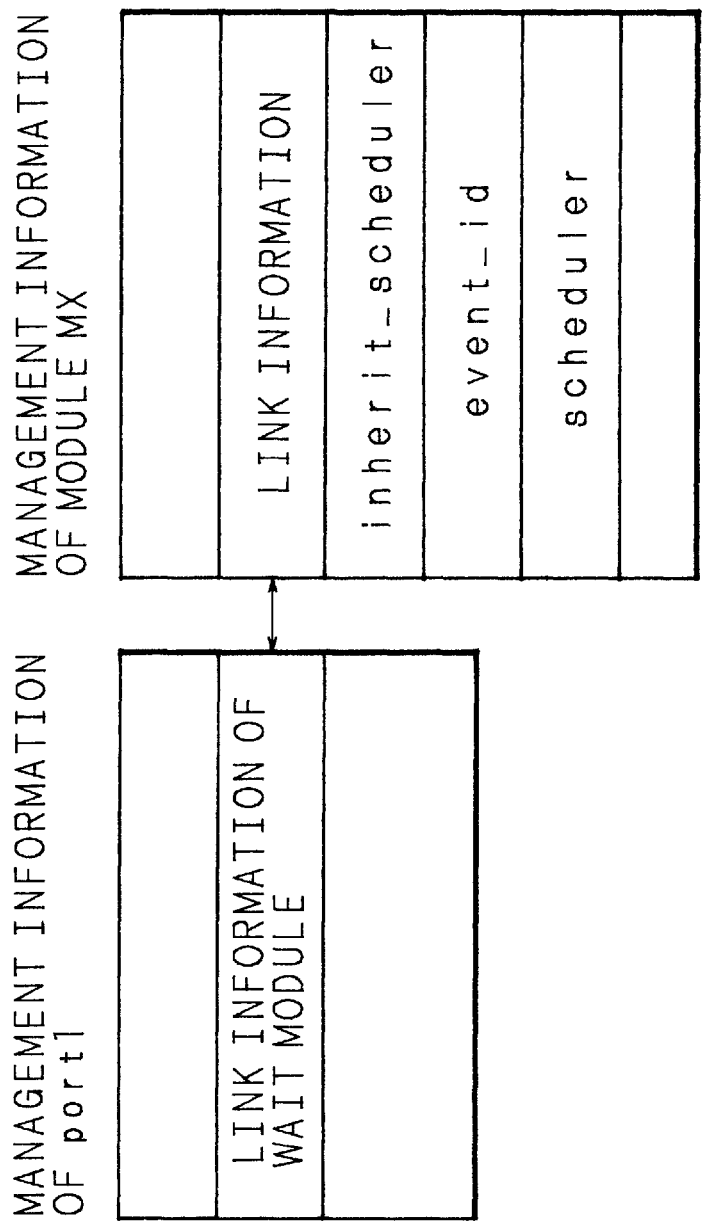
FIG. 12 is a schematic diagram showing contents of control information of ports and module control information for explaining an operation at the time when control of a certain module is switched to a control of different scheduler.

Now, by referring to a schematic diagram of FIG. 12 showing contents of management information of a port 1 and those of module management information of a module MX, such case is described, for example, that a module MX of the TSS module control unit 31B executes an instruction "condition wait (port 1, lock, bind)", and the module MA of the animation generating module control unit 31A executes an instruction "condition signal (port 1)".

When the instruction "condition wait ( )" is executed with specifying port 1 by the module MX of TSS module control unit 31B, as shown in FIG. 12, a link information field of wait module (module in a waiting state) in the management information of port 1 is linked to a link information field of management information of the module MX. At this time, the module MX obtains an "event id" from the event control unit 52, set it in a "event id" field of management information of itself, and comes to be in a waiting state.

On the other hand, as the module MA of animation generating module control unit 31A executes the instruction "condition wait ( )" with specifying the port 1, presence or absence of link information is checked in a link information field of wait module in the management information of port 1. In this case, since it is linked with the management information of module MX as described above, information of the animation generating module control unit 31A to which the module MA belongs is defined in an "inherit scheduler" field of management information of the module MX. Then, in order to activate the module MX, the "event id" set in the "event id" field is sent to the event control unit 52.

The module MX coming out of the waiting state checks whether bind is specified or not. When it is not specified, the instruction "condition wait ( )" is completed. When it is specified, the module MX is deleted from the module list of TSS module control unit 31B, and a bind message is transmitted to a scheduler specified in the "inherit scheduler" field of management information of the module MX, in this case, the animation generating module control unit 31A.

The animation generating module control unit 31A, which receives the bind message in such manner, set the information of animation generating module control unit 31A in a "scheduler" field of management information of the module MX, and the module MX is added to the module list of animation generating module control unit 31A. Thus, the module MX is taken over for control by the animation generating module control unit 31A from the TSS module control unit 31B.

By such operation as described, for example, such condition that only the module MA is controlled by the animation generating module control unit 31A for displaying only one object on the screen HG is changed to such that the modules MA and MX are synchronously controlled as a group by the animation generating control unit 31A for displaying two objects on the screen HG.

As a result, in such state that images of a bird and a fruit are generated by two action generating modules under control of the animation generating module control unit 31A, and displayed on the screen HG, by allowing these two action generating modules to be taken over for control by the TSS module control unit 31B when the objects come to a certain distance from each other, and allowing an action generating module controlled by the TSS module control unit 31B until that time for generating images of the bird holding the fruit in his bills to be taken over for control by the action generating module control unit 31A, an image of the bird holding the fruit in his bills is displayed on the screen HG by the image module. On the contrary, by allowing the action generating module under control of the animation generating module control unit 31A to be taken over for control by the TSS module control unit 31B, and allowing two action generating modules for displaying images of the bird and the fruit that has been taken over for control by the TSS module control unit 31B to be controlled by the animation generating module control unit 31A after the fruit falls out of the bird's bills, and is spaced by a certain distance from the bird, images of the bird and the fruit are synchronously generated, and displayed on the screen HG.

As described in detail above, according to a synchronous control method and apparatus of the invention, plural modules executed independently from each other can be controlled in precise synchronization with each other. It means that movements of characters and objects displayed on a screen can be synchronized with each other for generating animated images at real time.

Additionally, according to a method and apparatus for synchronous control of the invention, various processes of time sharing system can be also executed in parallel.

Moreover, because coincidence by frame is assured, in generating animated images at real time, movements of characters and objects displayed on a screen can be accurately synchronized.

Furthermore, by registering modules respectively conducting different processes that are to be synchronized to a module list, the modules can be surely executed once by module.

Further, images generated in an image module can be switched to, and displayed directly on a screen HG by means of a frame synchronizing signal.

Besides, according to a second aspect of synchronous control method of the invention, by classifying plural modules into plural groups as desired, and outputting a predetermined signal from a module, any module can be moved from a group to another. Accordingly, in the case the present invention is applied to a system for displaying animated images at real time, such images conventionally unrealizable can be easily generated that two objects moving toward each other, for example, are integrated into one image, and thereafter separated into two.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. A synchronous control apparatus, comprising:
   a trigger signal generating unit for periodically generating a trigger signal;
   plural action generating modules for executing different action generating processes which are to be synchronized for displaying on a screen;
   an image module for storing images into a video memory based on processing results by said action generating modules; and
   a module control unit for sequentially starting said action generating modules and said image module once according to such predetermined execution order that said image module is executed lastly, each time said trigger signal is inputted.

2. A synchronous control apparatus as set forth in claim 1, wherein other processes to be executed by a time sharing system are executed after said image module is completely executed and before said trigger signal is generated next.

3. A synchronous control apparatus as set forth in claim 1, further comprising two video memories, to which images are alternately stored by said image module, and of which contents are alternately read to display on said screen.

4. A synchronous control apparatus as set forth in claim 3, wherein other processes to be executed by a time sharing system are executed after said image module is completely executed and before said trigger signal is generated next.

5. A synchronous control apparatus as set forth in claim 1, wherein said module control unit comprises:
   a module list for storing information specifying said action generating modules and said image module which are under control of it self, and information relating to a starting order thereof; and
   a module starting unit for starting said modules according to said information stored in said module list.

6. A synchronous control apparatus as set forth in claim 5, further comprising two video memories, to which images are alternately stored by said image module, and of which contents are alternately read to display on said screen.

7. A synchronous control apparatus as set forth in claim 5, wherein other processes to be executed by a time sharing system are executed after said image module is completely executed and before said trigger signal is generated next.

8. A synchronous control apparatus as set forth in claim 1, wherein said trigger signal is generated by said trigger signal generating unit in such manner that it is in synchronization with a frame synchronous signal for switching images displayed on said screen.

9. A synchronous control apparatus as set forth in claim 8, wherein said module control unit comprises:
   a module list for storing information specifying said action generating modules and said image module which are under control of it self, and information relating to a starting order thereof; and
   a module starting unit for starting said modules according to said information stored in said module list.

10. A synchronous control apparatus as set forth in claim 8, further comprising two video memories, to which images are alternately stored by said image module, and of which contents are alternately read to display on said screen.

11. A synchronous control apparatus as set forth in claim 8, wherein other processes to be executed by a time sharing system are executed after said image module is completely executed and before said trigger signal is generated next.

12. A synchronous control apparatus, comprising:
    a trigger signal generating unit for periodically generating a trigger signal;
    plural action generating modules for executing different action generating processes which are to be synchronized with each other for displaying on a screen;
    an image module for storing images into a video memory based on processing results by said action generating modules;
    an interrupt processing unit for executing an interrupt processing having higher priority than starting of normal processes in time sharing system by receiving said trigger signal;
    a module control unit for sequentially starting said action generating modules and said image module once according to such predetermined execution that said image module is executed lastly by interrupt processing of said interrupt processing unit; and
    a time share system control unit for starting said processes after said image module is completely executed.

13. A synchronous control method in which plural modules for executing different processes are classified, respectively, into plural groups, modules included in each group are synchronously controlled by means of lower scheduler, group by group, by registering them to a module list, and each lower scheduler is controlled by a higher scheduler, comprising steps of:

setting a port management table for managing input signals inputted to each lower scheduler from each module including information for specifying a module under waiting state;

setting a module management table for each module, which contains a first information specifying the lower scheduler to which each module belongs, a second information indicating a port at which each module waits, and a third information specifying the lower scheduler to which each module belongs when a predetermined signal is transmitted by any other module to the port indicated by said second information; and when said predetermined signal is outputted with specifying any one of ports from a first module registered in said module list of a first lower scheduler, reading out the module management table of a second module under a waiting state specified by the information set in the port management table of the specified port out;

setting information for specifying said first module as the third information of the read out module management table; and taking over control of said second module by said first lower scheduler by deleting said second module from the module list of said lower scheduler to which said second module belongs, and registering said second module into the module list of said first lower scheduler.

* * * * *